(12) United States Patent  
Capretta et al.

(10) Patent No.: US 8,155,250 B2  
(45) Date of Patent: Apr. 10, 2012

(54) RECEIVER WITH FREQUENCY OFFSET COMPENSATION FOR M-STATE PHASE MODULATION

(75) Inventors: Pietro Capretta, Bruxelles (BE); Steven Terryn, Lauwe (BE); Jean-Jacques Schmit, Limelette-Ottignies (BE)

(73) Assignee: ST-Ericsson SA, Plan-les-Ouates (CH)

( * ) Notice: Subject to any disclaimer, the term of this patent is extended or adjusted under 35 U.S.C. 154(b) by 791 days.

(21) Appl. No.: 11/503,406

(22) Filed: Aug. 11, 2006

(65) Prior Publication Data

US 2007/0036247 A1    Feb. 15, 2007

(30) Foreign Application Priority Data

Aug. 12, 2005  (EP) .................................... 05447185

(51) Int. Cl.  
*H04L 27/06* (2006.01)

(52) U.S. Cl. ........ 375/343; 375/345; 375/355; 375/350; 375/281; 370/338; 370/252; 370/332; 370/203

(58) Field of Classification Search .................. 375/343, 375/350, 142, 344, 345, 316, 355, 149, 150; 370/338, 252, 332, 203  
See application file for complete search history.

(56) References Cited

U.S. PATENT DOCUMENTS

| 5,365,549 | A | * | 11/1994 | Kazecki ........................ 375/343 |
| 5,513,209 | A | | 4/1996 | Holm |
| 5,579,345 | A | | 11/1996 | Kroeger et al. |
| 5,818,882 | A | * | 10/1998 | Komatsu ........................ 375/344 |
| 5,940,435 | A | * | 8/1999 | Hendrickson .................. 375/147 |
| 5,946,359 | A | | 8/1999 | Tajiri et al. |
| 6,470,056 | B1 | | 10/2002 | Kurihara et al. |
| 6,487,260 | B1 | * | 11/2002 | Schweickert et al. ......... 375/343 |
| 6,590,872 | B1 | * | 7/2003 | Shiue et al. .................... 370/314 |
| 6,643,337 | B1 | * | 11/2003 | Pierce ............................ 375/343 |
| 6,771,720 | B1 | * | 8/2004 | Yang et al. .................... 375/345 |
| 6,898,198 | B1 | * | 5/2005 | Ryan et al. .................... 370/338 |
| 7,149,266 | B1 | * | 12/2006 | Imamura et al. .............. 375/355 |
| 7,403,556 | B2 | * | 7/2008 | Kao et al. ...................... 375/147 |

(Continued)

FOREIGN PATENT DOCUMENTS

EP    0 872 985 A2    10/1998

(Continued)

OTHER PUBLICATIONS

European Search Report from European Patent Application 05447185, filed Aug. 12, 2005.

(Continued)

*Primary Examiner* — Eva Puente  
(74) *Attorney, Agent, or Firm* — Wolf, Greenfield & Sacks, P.C.

(57) ABSTRACT

Method and apparatus for a wireless receiver are described which derive at least a first stream of first digitized samples from a received analog signal at a first sampling rate and identify a first frequency offset based on a plurality of parallel correlations using complex reference signals which differ from each other by phase offsets. A second frequency offset is identified based on tracking a demodulation accuracy for each symbol which is demodulated from the first stream of digitized samples. These frequency offsets can be used to rotate decision areas in the demodulator. The methods and apparatus may be used in a Bluetooth receiver.

22 Claims, 9 Drawing Sheets

U.S. PATENT DOCUMENTS

| | | | |
|---|---|---|---|
| 7,424,067 B2* | 9/2008 | Vanderperren et al. | 375/326 |
| 2002/0085652 A1* | 7/2002 | Okubo et al. | 375/344 |
| 2002/0123311 A1* | 9/2002 | Nagayasu | 455/70 |
| 2002/0163981 A1* | 11/2002 | Troemel, Jr. | 375/345 |

FOREIGN PATENT DOCUMENTS

| | | |
|---|---|---|
| EP | 0 892 528 A2 | 1/1999 |

OTHER PUBLICATIONS

European Search Report from European Patent Application 05447183, filed Aug. 12, 2005.

European Search Report from European Patent Application 05447182, filed Aug. 12, 2005.

European Search Report from European Patent Application 05447184, filed Aug. 12, 2005.

Rice, M. et al. "Polyphase filterbanks for symbol timing synchronization in sampled data receivers" Military Communications Conference. MILCOM 2002. Proceedings. Anaheim, CA, Oct. 7-10, 2002, IEEE Military Communications Conference, New York, NY: IEEE, US, vol. 1 of 2, Oct. 7, 2002, pp. 982-986, XP010631909 ISBN: 0-7803-7625-0.

Min J. et al. "Synchronization techniques for a frequency-hopped wireless transceiver" Vehicular Technology for the Human Race., IEEE $46^{th}$ Atlanta, GA, USA Apr. 28-May 1, 1996, New York, NY, USA, IEEE, US vol. 1, Apr. 28, 1996, pp. 183-187, XP010162373 ISBN: 0-7803-3157-5.

Henker M., et al. "Time-variant CIC-filters for sample rate conversion with arbitrary rational factors" Electronics, Circuits and Systems, 1999. Proceedings of ICECS '99. The $6^{th}$ IEEE International Conference on PAFOS, CYPRUS, Sep. 5-8, 1999, Picsataway, NJ, USA, IEEE, US, vol. 1, Sep. 5, 1999, pp. 67-70, XP010361448 ISBN: 0-7803-5682-9.

Gardner F. M. "Interpolation in Digital Modems. \Part I: Fundamentals" IEEE Transactions of Communications, IEEE Service Center, Piscataway, NJ, US, vol. 41, No. 3, Mar. 1, 1993, pp. 501-507, XP0003726963, ISSN: 0090-6778.

\* cited by examiner

RECEIVER WITH FREQUENCY OFFSET COMPENSATION FOR M-STATE PHASE MODULATION

BACKGROUND OF THE INVENTION

1. Field of the Invention

The present invention relates to telecommunication systems especially wireless systems, wireless transmitters and wireless receivers, especially those using the Bluetooth standard. The present invention also relates to semiconductor integrated circuits that implement a wireless receiver and/or a wireless transmitter especially those using the Bluetooth standard, as well as software for implementing the transmitter and/or receiver.

2. Technical Background

The Bluetooth wireless interface, introduced by the Bluetooth Special Interest Group (Ericsson, Nokia, IBM, Toshiba and Intel) in 1998, is designed to be a low-cost, low-power and short-range cable replacement.

Version 2.0+EDR of the Bluetooth standards introduces an Enhanced Data Rate (EDR) operation. The EDR standard is an improvement over the Basic Rate standard. New modulation schemes based on M-state phase modulation (M greater than 2) are proposed: π/4-DQPSK and 8DPSK, as well as the conventional GFSK. The bandwidth of the channel is 1 MHz.

The unit establishing a connection is called a master. The master unit communicates with slave units. The master unit uses a free-running clock to periodically transmit in every second slot and poll/select one of the slaves in a piconet by implicitly assigning the next slot for the transmission. There are two types of links:

synchronous connection oriented (SCO)
asynchronous connection-less (ACL)

The SCO links provide 64 kbit/s service data rate with stringent timing requirements and can be used for constant bit rate real-time services such as voice and video. Up to three SCO links can be established at the same time. The ACL links are packet-oriented and can be used for efficient data transfer for non-time-sensitive data services.

One of the distortion problems that needs to be compensated in a wireless receiver such as a Bluetooth receiver using EDR is carrier frequency offset. Frequency offset compensation for a receiver without M-state phase modulation (M greater than 2) is disclosed in U.S. Pat. No. 6,703,896 and makes use of monitoring the vector product of adjacent digitized signals. Although this type of frequency offset works well when the number of constellation points is low, the introduction of more complex modulation schemes means that frequency offset has a more serious effect, e.g. on bit errors for long packets in 3 Mbps EDR (3-DH5 packets).

U.S. Pat. No. 5,561,665 describes a frequency offset compensation technique using a vector product and a correlator. The correlator output is compared with a predetermined correlation threshold value and based on that an estimate of the offset is made. Determining an optimum predetermined correlation threshold suitable for all reception conditions can be difficult.

It is also known for frequency offset compensation to apply a rotation directly to digitized complex signals. Compensating directly on the signal can bring degradation to the overall performance and an increase in complexity. The received signal must be rotated and de-rotated, such multiplications being very costly as far as implementation cost goes. Degradation can occur as such rotations on the demodulated signals always bring along approximations which introduce errors.

SUMMARY OF THE INVENTION

An object of the present invention is to provide an improvement of frequency offset compensation as used in wireless receivers. For example the compensation can be used in wireless receivers using M-state phase modulation, especially M-state differential phase modulation such as in a Bluetooth radio demodulator for EDR operation. An advantage of the present invention is that direct frequency offset compensation on the received signals can be avoided.

The present invention provides a receive path in a receiver comprising: means for deriving at least a first stream of first digitized samples from a received analog signal at a first sampling rate, and means for identifying a first frequency offset based on a plurality of parallel correlations using complex reference signals which differ from each other by phase offsets. By selecting the phase offsets to be small, a fine tuning of the frequency offset can be obtained.

The present invention also provides a receive path in a receiver comprising: means for deriving at least a first stream of first digitized samples from a received analog signal at a first sampling rate, and means for identifying a second frequency offset based on tracking a demodulation accuracy for each symbol which is demodulated from the first stream of digitized samples. By selecting an accurate method of obtaining the demodulation accuracy a fine tuning of the frequency offset can be obtained. The demodulation accuracy can be an error value referred to an optimum demodulated symbol point. This can be obtained easily from the demodulated signals. The demodulation accuracy is preferably a phase error as this can be used directly to rotate decision areas, i.e. phase rotate the decision boundaries of the decision areas used to identify symbols. Alternative modulation accuracies can be used, e.g. the demodulation accuracy can be a value related to EVM or DEVM for each demodulated symbol.

The complex reference signals preferably differ from each other by phase offsets which lie within one decision area for the demodulated symbols. This makes a fine tuning of the frequency offset to values which results in only a fractional change in the position of demodulated symbols in the decision areas.

The means for identifying a first frequency offset obtains the first frequency offset by summing a correlation value for each correlation over a number of signal samples. The correlation value can be a value related to an energy when received samples are combined with the reference signals, the reference signals being derived from a known sequence in the received analog signal. The basic technique is well known and is easily implemented.

Optionally, at least one interpolating filter is provided in parallel with the first stream of first digitized samples for generating at least a second stream of digitized samples at the first sampling rate but offset with respect to the first stream by a fraction of a sample time period. This increases the granulation of the samples and therefore improves correlation.

The receive path includes a demodulator which uses rotated decision areas set in accordance with the first and/or second frequency offset. The demodulator can be an M state phase demodulator where M is greater than 2. The invention is particularly suitable for use with such demodulators, e.g. when an M-state differential phase modulation is used. An example is use of the receive path in a Bluetooth receiver.

The present invention also includes a method of operating a receiver comprising: deriving at least a first stream of first digitized samples from a received analog signal at a first sampling rate, and identifying a first frequency offset based on a plurality of parallel correlations using complex reference signals which differ from each other by phase offsets.

The present invention also includes a method of operating a receiver comprising: deriving at least a first stream of first digitized samples from a received analog signal at a first sampling rate, and identifying a second frequency offset compensation based on tracking a demodulation accuracy for each symbol which is demodulated from the first stream of digitized samples.

The frequency offset compensation methods of the present invention can be carried out as a two-stage method: in the first phase a first frequency offset compensation is identified based on the work of a correlator and a correlation process and in a second phase a frequency offset compensation is tuned based on tracking the risk for each point which is demodulated.

Once an offset is identified the received signal is not necessarily compensated directly but instead decision areas for the demodulation process are rotated, i.e. the boundaries for the decision areas for selecting symbols are altered effectively by rotating them. The information required for frequency offset compensation is obtained from the received signal stream itself, e.g. from the correlation process and/or from the demodulated signal itself. It does not need any correlation with predetermined correlation values.

The method may include a step of downconverting a received wireless signal into a lower frequency analog signal, the downconverting step being followed by a digitization step on said lower frequency analog signal such as to obtain the in-phase component and the orthogonal phase component of the digital baseband signal.

Alternatively, digitization can include an analog/digital conversion followed by a digital downconversion such as to obtain said in-phase component and said orthogonal phase component.

Optional filtering and vector product steps may also be applied.

The present invention includes software products for implementing any of the methods or devices according to the present invention in software for execution on a processing engine such as a microprocessor or an FPGA. The software may be supplied stored on a suitable machine readable signal medium such as an optical disk, e.g. CD-ROM or DVD-ROM, or disk or diskette, solid state memory, etc.

DETAILED DESCRIPTION

The present invention will be described with reference to certain drawings and to certain embodiments but this description is by way of example only. The terms "first", "second" etc. do not necessarily refer to a specific sequence of events in time or space unless there is specific reference to such a sequence. The present application relates to telecommunication devices especially wireless communication devices using M-ary modulation, e.g. M-state phase modulation with M equal to 2 or greater than 2, especially M-state differential phase modulation with M equal to 2 or greater than 2, i.e. the symbols are demodulated as phase differences between digitized signals rather than from absolute phase values. Specific examples will be described with reference to 8-DPSK, but the present invention can be applied to any modulation scheme using a plurality of constellation points, e.g. 2 or greater than 2, especially when differential phase modulation is used.

The present invention will mainly be described with reference to the Bluetooth EDR operation as an example only of how the invention can be applied to a wireless receiver.

Figures 1A, 1B:
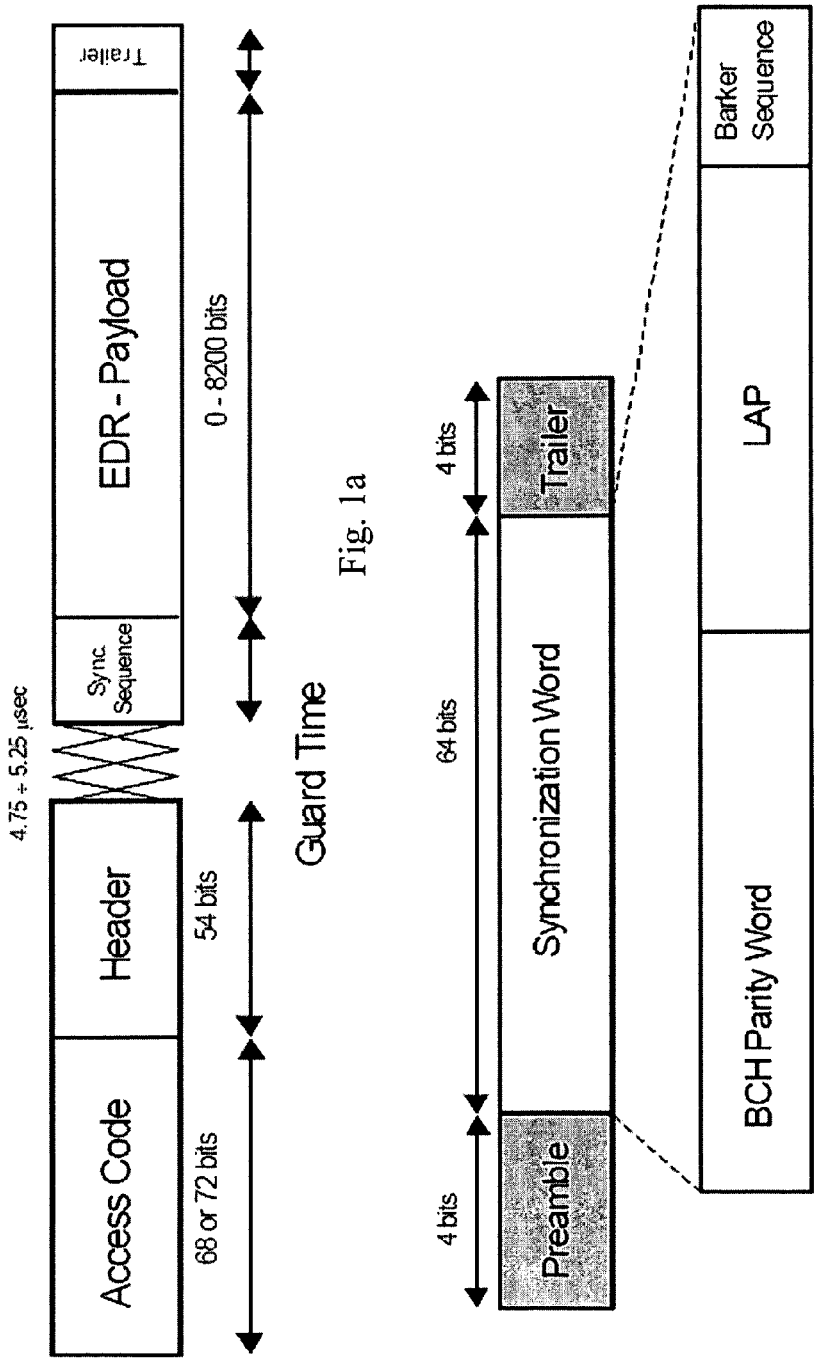
FIGS. 1a to c show the details of the packet data for a Bluetooth EDR operation.
Figure 1C:
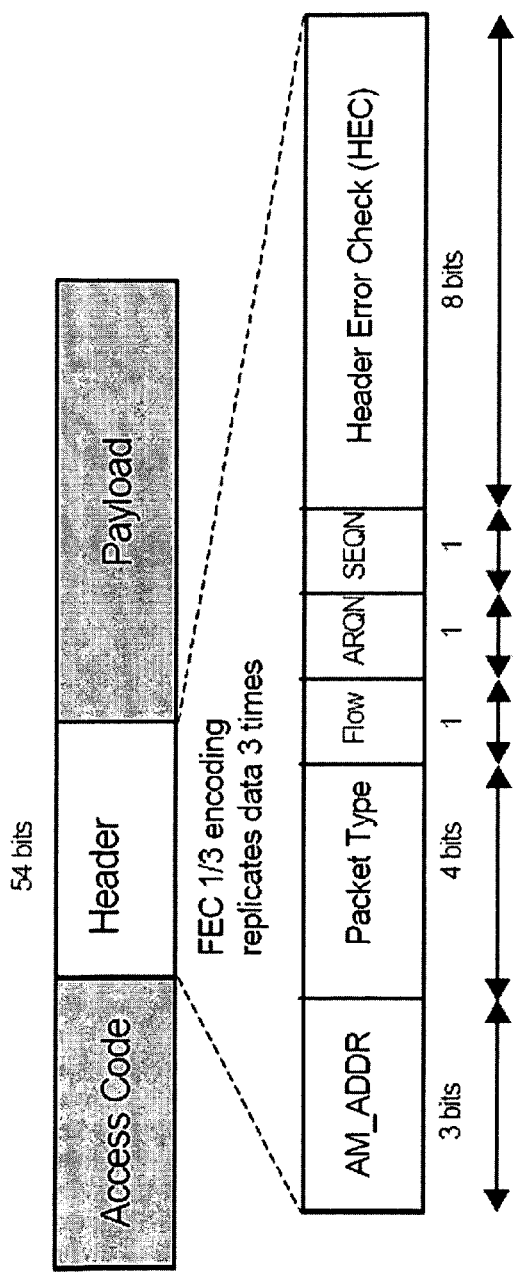

Every packet received by a Bluetooth receiver is made up of an access code, a header and a payload, as shown in FIGS. 1a to c. The access code is used to detect the presence of a packet and to address the packet to a specific device. It may be split into three parts: Preamble, Synchronization Word and Trailer. The Preamble is formed by 4 bits, which is useful to detect the edges of the packets; it is a fixed sequence 0101 or 1010, according on the value of the first bit of the Synchronization Word so as to form a known 5 bit sequence. A known sequence in a received data stream can be detected using a correlator which seeks, for example, energy peaks when the known sequence is combined, e.g. multiplied, with the received sequence. This allows the possibility of obtaining the DC threshold and the clock recovery. A Trailer is used at the end of the access code if there is a payload and its task is for use in determining DC threshold and clock recovery more accurately.

The Synchronization Word is formed from the 24 bit Lower Address Part (LAP) of the BT Device Address, using a particular algorithm. The synchronization word is made up of BCH Parity Word, LAP and Barker Sequence. The BCH (Bose-Chaudhuri-Hocquenghem) is important because when a device is correlating against its expected synchronization word, it will seek a strong peak where the reference synchronization word and the received data stream line up. This also provides the possibility for a slave to readjust its sub-slot timing to match up with the master. A match also indicates that this packet is intended for the receiving device and it will continue to receive; otherwise the radio can be shut down.

The header contains some or all of the control information involved with packet types and links. The packet header contains Link Control information associated with the packet. In total, the header contains 18 bits of information, which can be protected with two Forward Error Correction (FEC) schemes.

The first is a 1/3-rate repetition code where each of the 18 bits in the packet header is repeated 3 times, thus producing 54 encoded bits (1/3 means: 18 useful bits on 54 transmitted bits). This big redundancy is used because it is necessary for the Link Protocol that each header's bits are decoded. The second coding scheme is the 2/3-rate code that uses a shortened Hamming binary block code, applied to the payload header, payload data and CRC as well as the tail bits. However, the FEC code is avoided for the Enhanced Data Rate Header, so data bits are transmitted without any replication.

All the slaves will receive an Active Member Address (AM_ADDR) given by the master during the paging process. This will become the connection handle used to address all communications to the slave and for the master to differentiate response from different slaves. The 3 bits used are sufficient if the slaves number seven at maximum. An AM_ADDR of zeros implies a broadcast packet which is received by all slaves.

The Packet Type defines the type of traffic carried by this packet (e.g. ACL, SCO, NULL, POLL), the type of error correction used by payload, and how many slots the packet will actually last. When a device's buffer is full, it sets the Flow bit to indicate that it is not now able to receive other packets. The ARQN flag is asserted by a device to indicate that the previous packet was successfully received. In the case of loss of ARQN due to failure of the returned header, the sender will assume a Negative-Acknowledge and accordingly retransmit the packet. If the one bit SEQN transmits the same packet, the flag is not toggled. In this way the receiver is clearly able to understand if it has received a new message or a copy which is to be ignored. The Header Error Check (HEC) is a simple CRC (Cyclic Redundancy Check) on the header represented in octal notation by the generator polynomial 647. It is used to initialize either the master and/or the slave, through the DCI (Default Check Initialisation).

The payload contains the actual message sent from L2CAP or LM, or data if it is at the end of the stack. The new standard EDR has the same initial structure for access code and header, but introduces some modifications within payload structure, in order to transmit longer packet types. In this way, there are two different structures for the Payload. However, for both, the ACL payload is split into three parts: the Payload Header, the Payload Data itself, and the Cyclic Redundancy Check (CRC). The ACL Payload Header is formed by 16 bits and contains the following information. The Logical Channel (L_CH) field indicates if this payload is the beginning or the continuation of a L2CAP message (since L2CAP message may be long several packets) or an LMP message (which is carried only in single shot ACL packets). Flow is a flag-control data transfer at the L2CAP level. Length is a field detail containing information on bytes of the payload. The remaining bits are reserved to the EDR packet transmission or are unused, like in Basic Rate.

A Payload Trailer is present only within the new payload structure, relative to the Enhanced Data Rate standard. It is formed by 2 DPSK symbols: 4 bits={00, 00} for π/4-DQPSK modulation, or 6 bits={000, 000} for the other, 8DPSK. It is useful not to allow instantaneous interruption of data packets and modulation.

For the Enhanced Data Rate transmission, packet structure is very similar to the Basic Rate packets. The access code and the packet header are identical in format and are re-transmitted with the GFSK modulation, so that acquisition and packet identification is the same as that used in Basic Rate standard. The difference with the basic packet is the introduction of the Guard Time and Synchronization Sequence at the end of the header. A guard time of 4.75~5.25 μsec starts at the end of the last GFSK symbol of the header and ends at the beginning of the synchronization sequence before the payload. It is useful to allow settling and switching in the hardware during the transition from one modulation scheme to another one.

Figure 2:
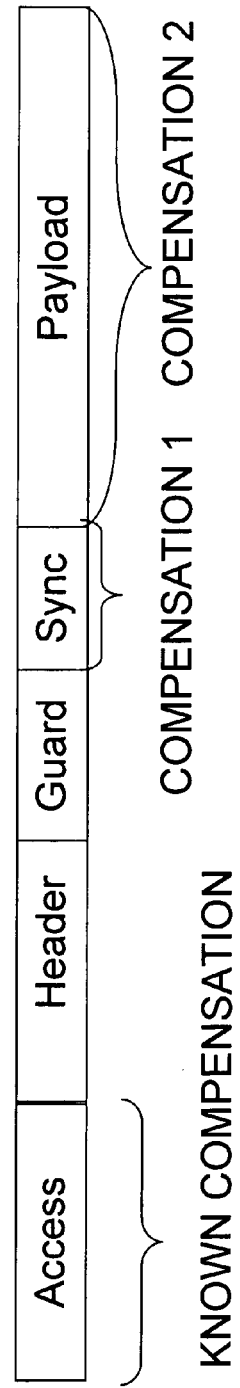
FIG. 2 shows the switch point for application of a frequency offset compensation in accordance with an embodiment of the present invention.

Following the guard time there is a DPSK-modulated synchronization sequence which is identical for both π/4-DQPSK and 8-DPSK modulations—see FIG. 2. Its length is of 11 μsec (11 symbols) and it is made up of one reference phase symbol followed by ten DPSK symbols. It is used to complete acquisition prior to demodulating the π/4-DQPSK or 8-DPSK of the payload. At the end there are two Trailer symbols.

With reference to FIG. 2 frequency compensation in accordance with embodiments of the present invention is provided in one or two stages. Both stages of frequency compensation in accordance with the present invention are provided by at least monitoring the section of the slot which is modulated with the M-state phase modulation, e.g. after the access code, header (and optionally after the guard time depending on the modulation thereof)—see FIG. 2. The present invention also optionally allows a conventional frequency offset compensation at the beginning of the slot in addition to the compensation provided by the present invention—see FIG. 2. Such a conventional compensation can include updating local voltage controlled (analog front end) or numerically controlled (digital part) oscillators, e.g. in down mixers in accordance with U.S. Pat. No. 6,703,896. This conventional offset compensation should be latched by the time of the receipt of the synchronization word of the Access Code.

In one stage according to the present invention a first frequency offset compensation is active based on a first know sequence such as the synchronization sequence. The second frequency compensation according to the present invention is active during the payload. The purpose of these additional frequency offset compensations is to fine tune the offset compensation especially for the M-ary modulated section of the slot when known compensations, operating earlier in the slot, e.g. as known from U.S. Pat. No. 6,703,896 are not sufficient to prevent errors, e.g. a noisy environment.

A basic receiver such as a Bluetooth receiver or transceiver will be described with reference to FIG. 3. When implemented in a transceiver a transmit path is also provided with the present invention which, however, will not be described as it can be conventional.

Figure 3:
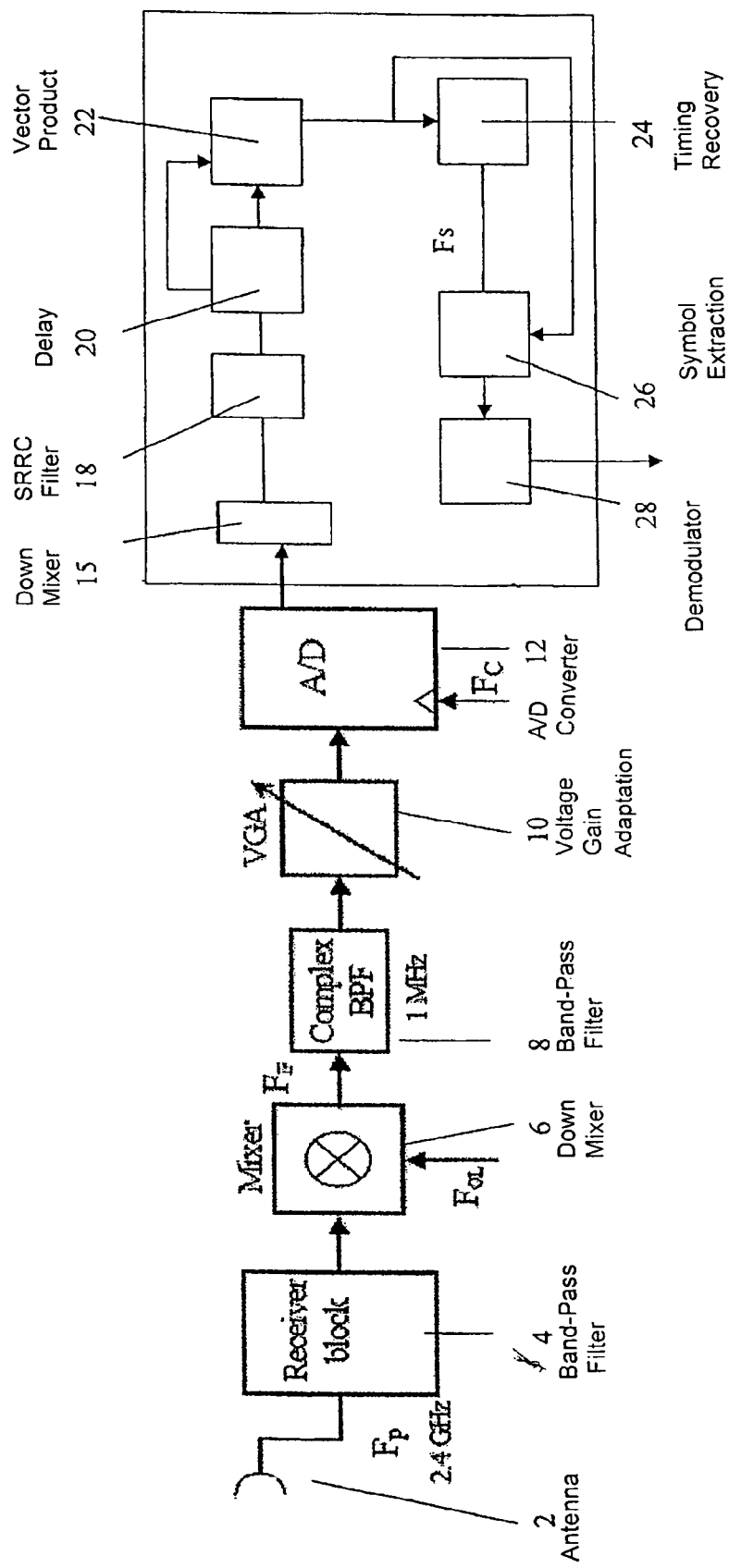
FIG. 3 shows a flow diagram for a method according to an embodiment of the present invention.

The analog radio front end and the digital part separated by an analog to digital converter (ADC) as shown in FIG. 3 are examples only and are not limiting for the present invention. The radio front-end includes a radio downconversion device, e.g. comprising RF filters, oscillators, and image-reject mixers to process input signals at high frequencies. To keep costs down, the input signal can be shifted to a lower intermediate frequency which allows on-chip construction of low power filters. For example, the Bluetooth RF transmitted signal centered on 2.4 GHz is received at an antenna 2 and is processed by the radio downconverison device including a Reception band-pass filter 4, an analog Down-Mixer 6 and a Complex band pass filter 8 used to obtain the bandpass signal, which occupies a 1 MHz-band centered on the intermediate frequency. Although not shown, the local oscillator frequency ($F_{OL}$) value of the down-mixer 6 can be modified by feedback control from a timing recovery block, e.g. in the analog or the digital part. A Voltage Gain Adaptation (VGA) block 10 can be used in order to adapt the signal amplitude to the input dynamic range of the other blocks in the device. In particular it is useful to control the amplitude so as not to overrange the A/D converter (ADC) 12. In the ADC 12, the signal received from the analog downconversion device is sampled with a sampling frequency $F_C$, and digitized. For example $F_C$ is preferably a frequency which is a whole number multiple of the baseband frequency, e.g. a multiple of 1 MHz for Bluetooth, such as 6, 8, or 13 MHz. Hence, the signals are oversampled in the ADC 12 as the sampling frequency is a preferably multiple of the baseband signal frequency.

In the following some possible components downstream of the ADC 12 in FIG. 3 are described. These are not limiting for the invention. As an example of possible downstream blocks the digitized signal from the ADC 12 can be processed by a down mixer 15 in which in-phase and quadrature phase signals are generated at the baseband frequency by multiplying the received signal by sine and cosine signals from a local numerical oscillator. If the down converter in the analog front end includes a downconverter to baseband this downmixer 15 can be omitted. The in-phase and quadrature signals are optionally fed through a suitable filter, e.g. an SRRC filter 18. An SRRC is a filter which approaches a Nyquist filter, i.e. one which has a perfect (vertical) cut-off. In fact an SRRC filter does not have a perfect cut-off but has a roll-off which means that the filtered output requires more bandwidth than a perfect Nyquist filter. The complex digitized input signal to be supplied to the SRRC is split into the two real components: the in-phase and the in-quadrature digitized signals. At this point, each component is filtered by the SRRC filter 18. A FIR filter structure can be chosen for the implementation of the SRRC 18. The FIR filter is provided with coefficients (taps) to thereby perform SRRC filtering for both the complex signal components. Other filters may be used, e.g. polyphase filters. The shaped samples from the SRRC 18 are supplied to a Vector Product block 22. The block 22 combines two digitized complex symbols, one being delayed by one sample period in block 20. The output of the vector product block 22 is used to obtain the symbol timing in block 24. A Symbol-Extraction block 26 selects one digitized symbol every symbol period in the position specified by the timing recovery block 24. This symbol is chosen among the samples belonging to the digitized signal.

Figure 4:
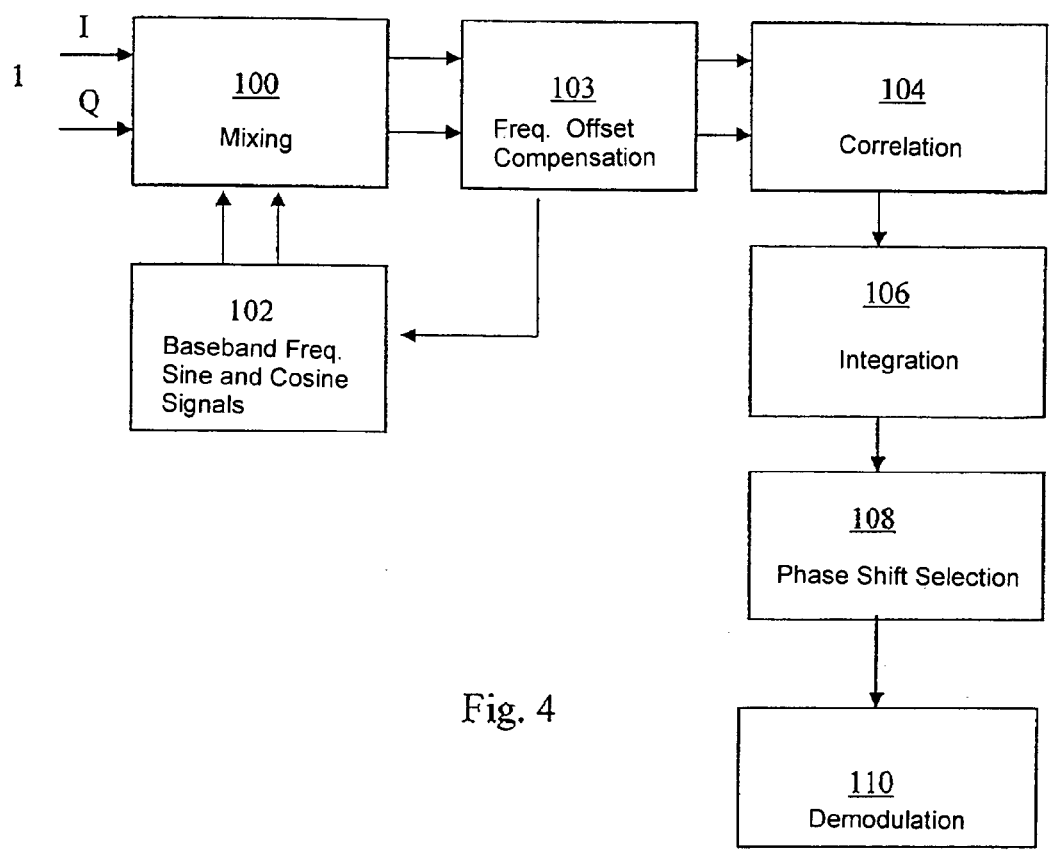
FIG. 4 shows a flow diagram for a first stage of frequency offset compensation according to an embodiment of the present invention.

FIG. 4 is a schematic flow diagram of one compensation for frequency offset in accordance with an embodiment of the present invention. In an ADC the signal is oversampled with a sampling frequency $F_C$ e.g. 6 or 8 MHz, and the signal is digitized. The output from the ADC is optionally mixed in a mixing step 100 if the intermediate frequency of the analog front end is not the baseband frequency. In the mixing step 100 baseband frequency sine and cosine signals obtained in step 102, e.g. from sine and cosine tables stored as look-up tables in a memory such as a Read Only Memory (ROM), are mixed with the signals from the ADC, e.g. by multiplication. Digitized I and Q vectors provided by the mixing step 100 (or directly from the ADC if no mixer is used) working in-phase and in-quadrature can be fed from the mixing step (or from the ADC) to further digital elaboration components, e.g. an optional filtering step (not shown), e.g. with a filter such as an SRRC filter. In step 103 a conventional frequency offset compensation is carried out, e.g. as known from U.S. Pat. No. 6,703,896 and the local oscillator used in step 100 is updated, e.g. this update is latched by the time that the synchronization word is detected—see FIG. 1b. In step 104 later signals in the slot which are M-state phase modulated are correlated with a known sequence, e.g. the synchronistion sequence of FIG. 2. A correlation will typically seek an energy maximum in the result of combining, e.g. multiplying, a sequence of complex reference signals derived from the known sequence with the received signals.

In accordance with this embodiment a plurality p of correlation processes are carried out in parallel, the complex reference signals used for each correlation process differing from each other in that they are rotated by small phase changes with respect to each other. These phase changes will normally be less than the phase difference between symbols, i.e. the phase differences will be a fraction of the phase differences used for identification of a symbol in the modulator. The results of the correlations are individually integrated over a number of samples in step 106. The correlation process of the plurality of parallel correlation processes with the maximum value of this integration is the one where the phase rotation of the complex reference signals most closely matches any phase rotation introduced by a frequency offset. Hence in step 108 the correlator corresponding to this maximum integration and the corresponding phase shift for that value of p is selected.

Figure 6:
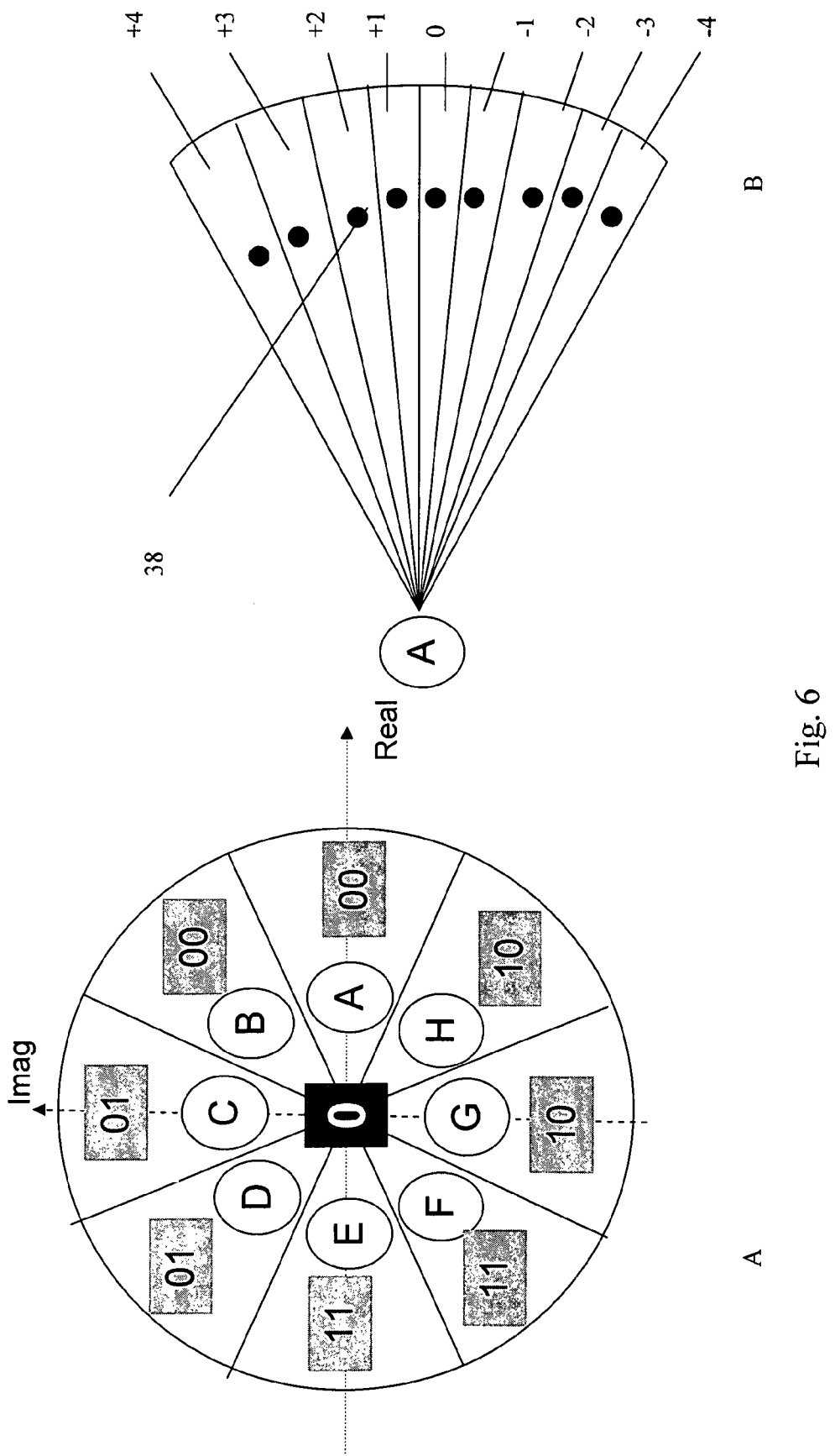
FIG. 6a shows decision areas A to H for an 8 state phase modulation and FIG. 6b shows the complex reference signals for one decision area of this FIG. 6a in accordance with an embodiment of the present invention.

Demodulation in accordance with the present invention is carried out by examining decision areas in a constellation diagram. The output from the vector product block is two signals and may be summarized as:

$$V\cos(K) = I_K \cdot I_{K-1} + Q_K \cdot Q_{K-1}$$

$$V\sin(K) = -I_K \cdot Q_{K-1} + Q_K \cdot I_{K-1}$$

Where I and Q are the in-phase and in-quadrature signals received by the vector block and K is the number of the relevant sample. The notation is basically the same as used in U.S. Pat. No. 6,703,896, but applied to an M-state phase modulation with M grater than 2. This can be written as, $$\begin{aligned} V\cos(k) &= A_K A_{K-1} \cos\Phi_K \cos\Phi_{K-1} + A_K A_{K-1} \sin\Phi_K \sin\Phi_{K-1} \\ &= A_K A_{K-1} \cos(\Phi_K - \Phi_{K-1}) \\ &= A_K A_{K-1} \cos(\Delta\Phi_K) \end{aligned}$$

$$\begin{aligned} V\sin(k) &= -A_K A_{K-1} \cos\Phi_K \sin\Phi_{K-1} + A_K A_{K-1} \cos\Phi_{K-1} \sin\Phi_K \\ &= A_K A_{K-1} \sin(\Phi_K - \Phi_{K-1}) \\ &= A_K A_{K-1} \sin(\Delta\Phi_K) \end{aligned}$$

where $\Delta\phi_k$ is the difference in phase value which is related to the symbol to be determined. This phase difference is not obtained directly but only as the sine and cosine projections. Its values for $\pi/4$ DQPSK are $\pm\pi/4$ and $\pm3\pi/4$. For 8-DPSK they are 0, $\pm\pi/4\pm\pi/2$, $\pm3\pi/4$ and $\pi$. The symbols are identified in the demodulator by the position within the constellation diagram, i.e. within decision areas as shown in FIG. 6a for 8-DPSK. The demodulation is then continued in step 110 with rotated decision areas rotated by the amount of phase shift p determined for the correlator selected in step 108—see FIG. 7. By rotating the decision areas with the phase shift related to the value p, the determined phase differences from the received signal will lie more centrally in the decision areas and there is less chance of an error. By this means one fine tuning of the frequency offset compensation in accordance with the present invention is carried out.

Figure 5:
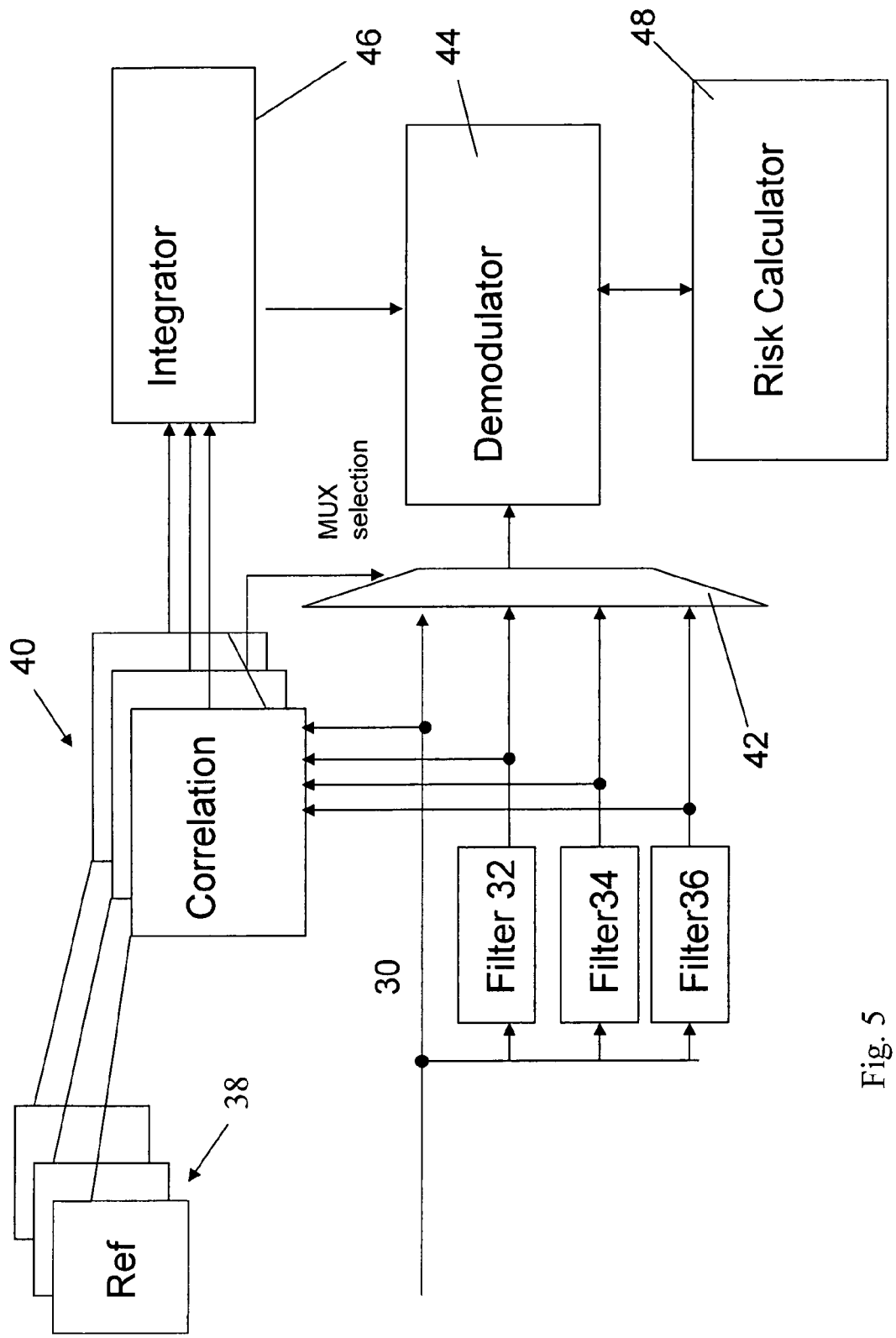
FIG. 5 shows a wireless receiver according to an embodiment of the present invention capable of performing a one stage or two stage frequency offset compensation according to the embodiment of FIG. 4 and/or FIG. 8.

FIG. 5 shows an embodiment of the present invention including a specific implementation of the Symbol-Extraction block 26 and the demodulator block 28 of FIG. 3. In a first independent and optional aspect of this embodiment of the present invention the problem is addressed that the number of samples arriving at the Symbol-Extraction block 26 can be low, e.g. at a rate of 6 or 8 MHz. As shown in FIG. 5 this stream of samples is given the reference number 30. The present invention can be carried out only with the data stream 30 but for increased accuracy a better sample granularity is preferred. Accordingly, in accordance with this option, at least one additional interpolating filter 32, 34, 36 is provided in parallel with the stream 30. The one or each interpolating filter 32, 34, 36 provides at its output samples at the same rate as the stream 30, e.g. clocked at 6 or 8 MHz, but each set of samples is offset with respect to the sample stream 30. For example, if the sample stream 30 is running at 6 Mhz and there are three filters 32, 34, 36 in parallel, then the sample stream output from the first filter 32 is offset with respect to the sample stream 30 by one quarter of a sample period. The output of the second interpolating filter 34 is offset one quarter of a sample period with respect to the output from filter 32 and the output of the third interpolating filter 36 is offset by one quarter of a sample period compared to the output of filter 34. Interpolation filters are well known to the skilled person. For example, each of these filters 32, 34, 36 can be a FIR filter needing only 10 taps. Alternative interpolation filters may be used, e.g. polyphase filters.

The input to the Symbol-Extraction block 26 is therefore equivalent to 4×6 MHz or a sample stream clocked at 24 MHz. This provides an additional accuracy in selecting the sample for each symbol while requiring only extra filters of low complexity and small size. Hence the electronic circuitry making up the digital part of the receiver is run at a low frequency such as 6 MHz or 8 MHz which means the components in the digital receiving path are small size, e.g. the filters but a better sample granularity is rebuild before the symbol extracting block 26. This means that the power consumption can be kept low.

Referring again to FIG. 5, in a further independent aspect of this embodiment of the present invention, the problem is addressed of how to fine tune the compensation of any frequency offset, e.g., independently or in addition to the one in accordance with the method described with respect to FIG. 4. A plurality of correlation processors 40 are provided for correlating in parallel the data stream 30 or also the streams from one or more interpolation filters 32, 34, 36 with complex reference signals 38 derived from a known sequence in the data stream, e.g. the synchronization sequence of FIG. 2. The complex reference signals are stored in an appropriate memory e.g. a ROM (read-only memory). The symbols to be detected by the demodulator 44 are detected by the location of the phase difference between symbols, i.e. whether the phase difference obtained from the vector product block, within constellation decision areas A to H in FIG. 6a. In this case 8-DPSK is shown with 8 decision areas of eight different symbols 00 to 10 in binary code depending up the value of the phase component. This is an example of an M-state phase modulation with M equal to 8, i.e. greater than 2. The different complex reference signals 38 differ from each other by a fractional phase rotation of one decision area. This is shown in FIG. 6b in which 9 complex reference signals have 9 different phases within one decision area, e.g. the area A, −4 to +4. Any suitable number of complex reference signals can be used, e.g. 8, depending on how accurate the frequency correction is to be. As an example, the area A is divided into 9 equal phase rotations −4 to 4 centered on the optimum phase for that area labelled with 0.

The correlators 40 seek for correlation each using one of the plurality of complex reference signals 38. In each correlation the correlation value is calculated, e.g. an energy value when the complex reference signal 38 is combined with the received signal stream or streams, e.g. by multiplication. The correlation value Xp(i) is determined for each of the reference signals p (e.g. each of 17 different parallel correlations from +8 to −8) and its associated correlation process 40 and for each sample i of the stream, e.g. samples running at a sample rate of 6 MHz, 8 MHz, 24 MHz etc. timing depending on the implementation used. Integrator 46 integrates for each correlation process using a reference signal p an integration value Bp over a plurality of signal samples, e.g. 2N:

$$Bp(i) = \sum_{k=-N}^{k=+N} Xp(k)$$

The effect of frequency offset is to cause a phase rotation of the constellation points. The correlation process 40 generating the maximum value of Bp will indicate which phase rotation used for the relevant reference signal p is the offset to be used for frequency offset compensation: so if p is +1 the decision regions will be rotated +1. This is shown schematically in FIG. 7a showing a rotation of the decision areas by +1 and +2. This phase information is provided to the demodulator 44 which then uses this phase offset for determining its decision areas in demodulating the signals. The max of Bp(i) indicates the best decision area, among the available p signals 0, +1, −1 . . . etc, which means the rotation of the decision area is based on an absolute value which is unknown before the correlation. The best decision area and what is the estimated offset is based only on the real time correlation values obtained by correlation in parallel in several rotated decision areas. This avoids the use of a predetermined correlation threshold value.

Figure 7:
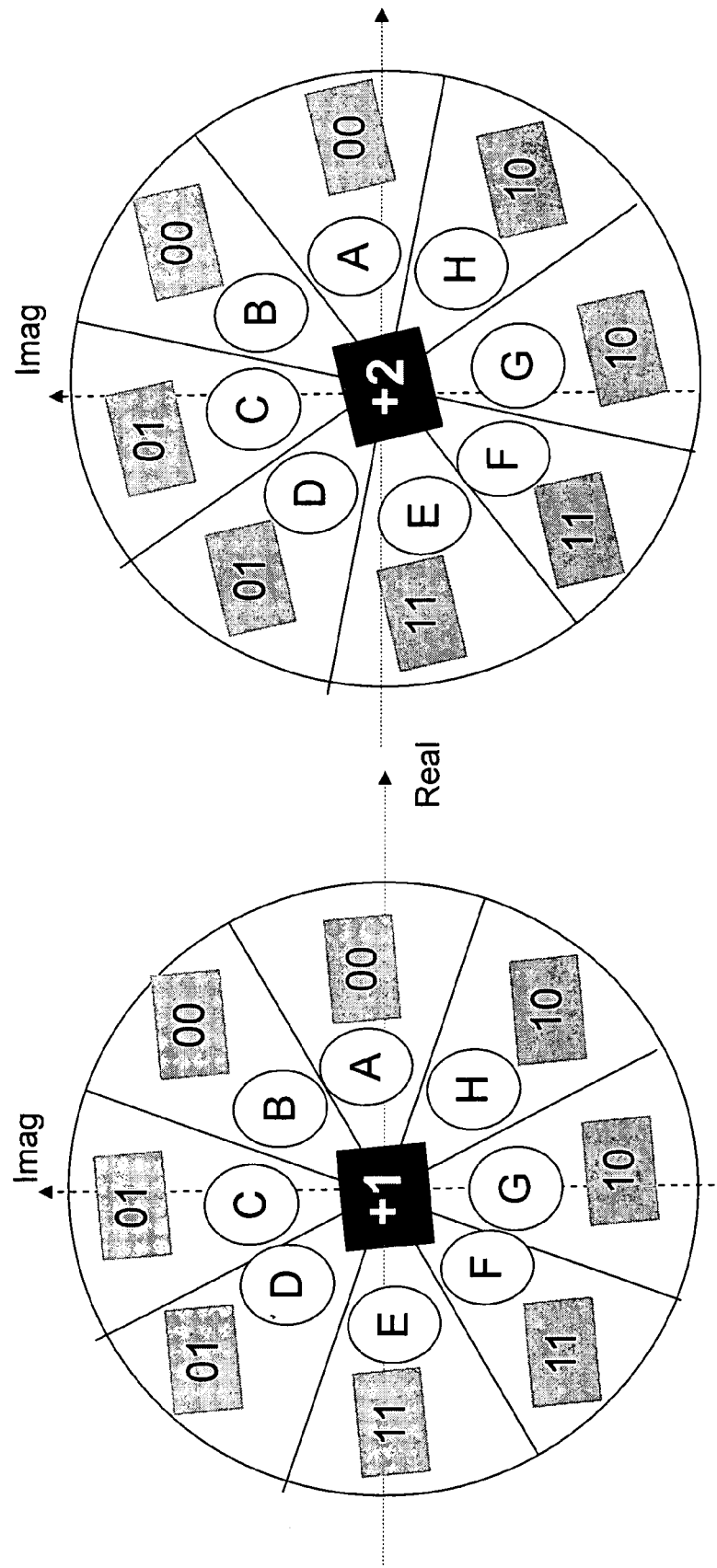
FIG. 7 shows partial rotations of the decision areas for use by a demodulator in accordance with an embodiment of the present invention.
Figure 8:
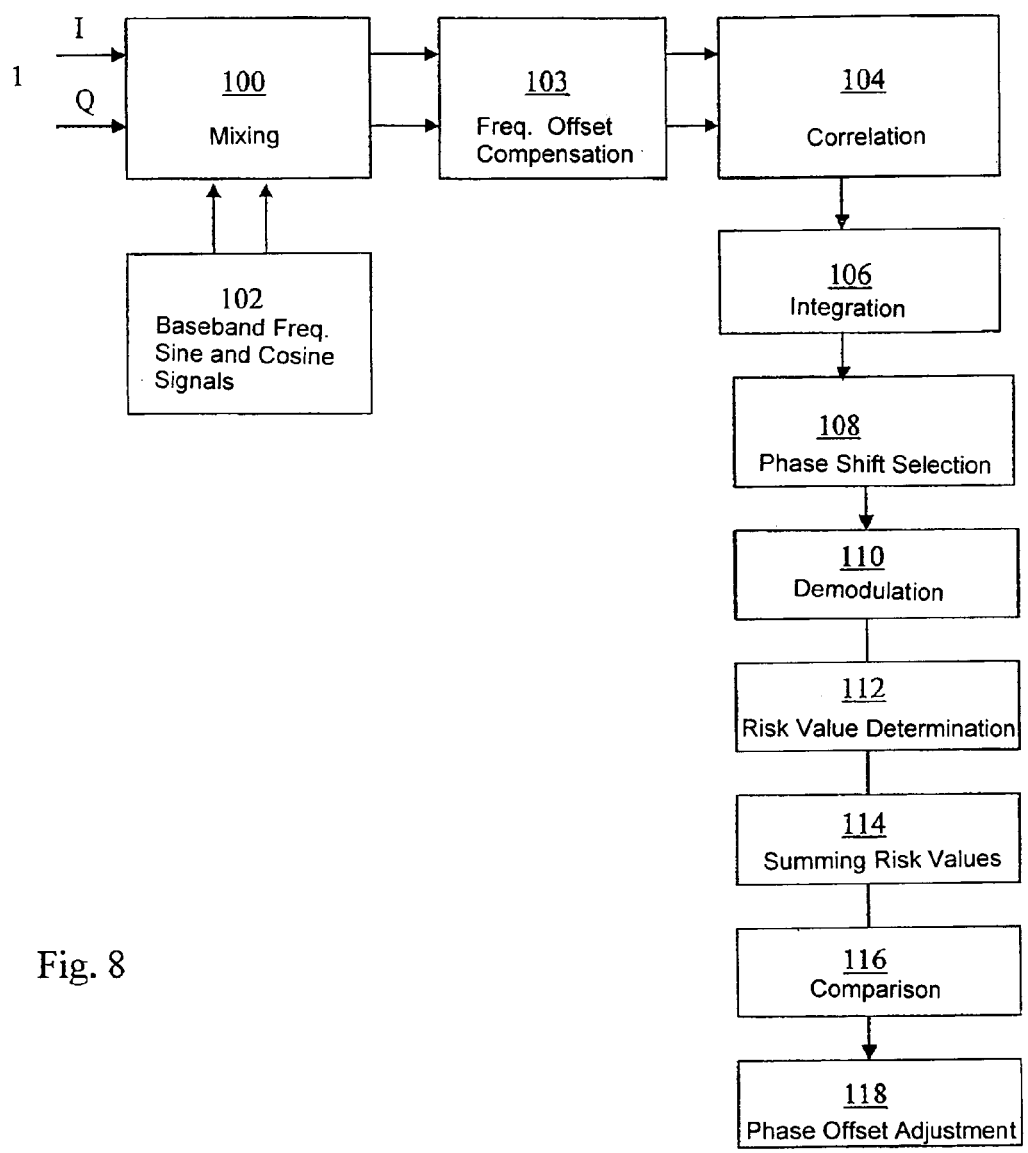
FIG. 8 shows a flow diagram for a second stage of frequency offset compensation according to an embodiment of the present invention
Figure 9:
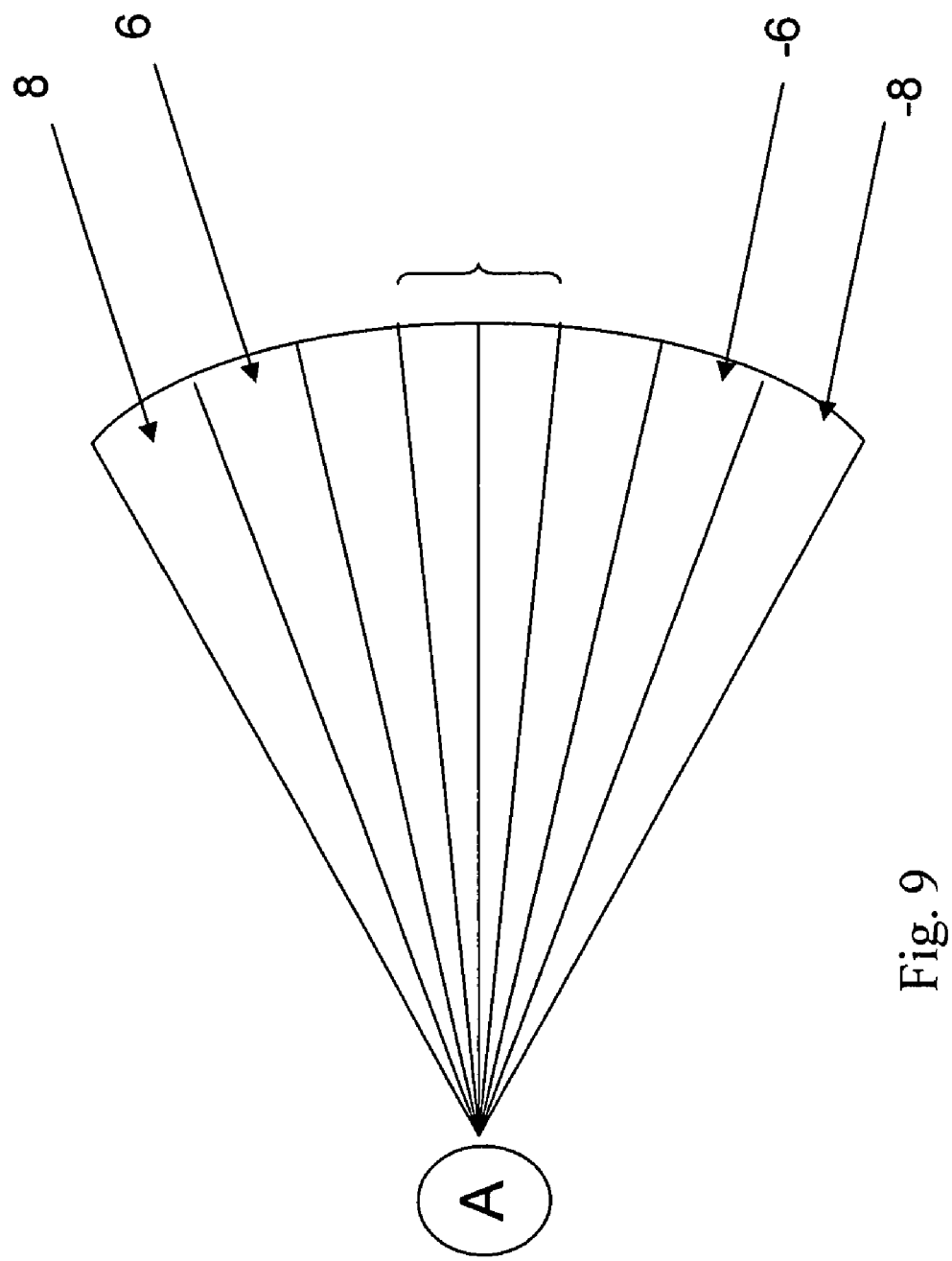
FIG. 9 shows a decision area of FIG. 6a and shows how demodulation accuracy values are assigned to demodulated symbol points depending on how close they are to the boundaries of a decision area in accordance with an embodiment of the present invention.

FIG. 8 is a schematic flow diagram of a further compensation for frequency offset in accordance with an embodiment of the present invention. The steps 100 to 110 are the same as described with reference to FIG. 4. As later signals are to be monitored the method steps of the second compensation can optionally be included after the method steps 100 to 110. The purpose of this embodiment is to monitor later signals in a slot, i.e. those relating to the payload to fine tune the frequency offset in this region of the slot either as an alternative or as well as other frequency offset compensations. The solution to this problem is to determine a value related to a parameter of the demodulated signal which can be used to assess the average or long term phase error in demodulated symbols. It is assumed that this phase error is due to a frequency offset. For example, a demodulation accuracy can be used as the parameter centered about a value for a central or optimal symbol in any of the decision areas, e.g. A to H as shown in FIG. 6a. The starting point for the second frequency compensation can be the end of the first compensation according to the present invention, i.e. step 110 of FIG. 4 as shown in FIG. 7, i.e. the demodulator 44 has been instructed by the integrator 46 to use decision areas with a certain phase rotation, e.g. +2. Using these modified decision areas the demodulator 44 continues to demodulate symbols. Each of these demodulated symbols will be located somewhere in one of the decision areas A to H. The exact position will vary randomly due to noise. However, if there is a further frequency offset, then the demodulated symbols will start to congregate closer to one of the decision boundaries. The second compensation according to the present invention tracks the average phase of the demodulated symbols within the decision areas over a number of samples. For some or each demodulated bit a value related to the phase error within one or more decision areas is determined in step 112. Each decision area can be divided into equal phase errors centered about the optimum central phase for that area—see FIG. 9 for decision area A. For example, FIG. 9 shows 8 areas, 4 on one side of the central phase for that decision area and 4 on the other. Each of these smaller areas is assigned a value which increases or decreases from the centre. The areas in FIG. 9 closest to the decision boundaries are assigned the arbitrary value plus or minus 8, the next inner area 6, the next one 4 and so on. These values will be called "risk values" as they indicate that the higher the value, the greater the risk that the demodulated symbol is in error. In step 114 the sum of the risk values for a number N of symbols is calculated. The position in each decision area can be determined by examining the received values of Vcos(K) and Vsin(K)—see above.

In step 116, if this sum becomes higher then a certain positive threshold it means that most of the symbols are being demodulated on the higher side of the region. Hence in a comparison step the summed risk values over a number of symbols is compared with a threshold. If the sum of the risks over a period of time is positive then the offset phase rotation used in demodulation process needs to be increased in step 118. If the summed value becomes more negative than a certain negative threshold then the phase offset used by the demodulator is decreased in step 118.

An implementation of this method is shown schematically in FIG. 5. A correlator 40 receives the samples from the direct stream 30 and optionally from 30 the interpolating filters 32, 34, 36 and selects one of these samples from one of the plurality of streams, e.g. one of the 4 streams 30 and the outputs from filters 32, 34, 36. It feeds back to a multiplexer 42 and to a sampling and demodulator block 44 the following information:

i) The best sampling point
ii) Which of the streams is to be selected.

The multiplexer 42 selects the relevant signals from the stream 30 or those from the filters 32, 34, 36 and feeds these signals to the demodulator block 44. The demodulator block 44 demodulates the symbols using the sampling time provided by the correlator 40. The risk calculation sum of step 114 and the decisions of step 116 are performed in a risk calculator 48. The output from the risk calculator 48 is an instruction to the demodulator 44 to change to a different phase error, e.g. to change the boundaries of the decision areas such as to +1 as shown in FIG. 7.

Other demodulation accuracy parameters can be used. Another example of a demodulation accuracy parameter which can be used with the second compensation method of FIG. 8 is a value related to an energy of demodulated symbols around the optimum demodulated symbol in the middle of a decision area. A suitable energy measurement is for example the Error Vector Magnitude when the symbols are demodulated as absolute phases and Differential Error Vector Magnitude (DEVM) when the symbols are demodulated as phase differences. Error Vector Magnitude is a measure of the difference between a waveform, e.g. an ideal waveform and a measured waveform. The difference is called the error vector for an M-ary I/Q modulation scheme. The DEVM is the error vector magnitude with respect to the difference signal between two symbols. A negative value must be given to the energy value if it is on one side of the optimum demodulation point and a positive vale if it is on the other as shown schematically in FIG. 9. The receiver according to the present invention may be implemented as a program running on a personal computer. The above receiver can be implemented as an integrated circuit or by other means, e.g. on a Printed Circuit Board. The receiver according to the present invention may be implemented on an Integrated Circuit comprising an embedded processor. The processor may be a microprocessor or a programmable gate array such as a Field Programmable Gate array or any other suitable processing means.

In particular software according to the present invention may include code segments which, when implemented on a processing engine, execute means for identifying a first frequency offset based on a plurality of parallel correlations using complex reference signals which differ from each other by phase offsets. The code may also include means for identifying a second frequency offset based on tracking a demodulation accuracy for each symbol which is demodulated from the first stream of digitized samples. The modulation error is preferably a phase error. The code may also execute a demodulator, wherein the demodulator uses rotated decision areas in accordance with the first and/or second frequency offset. In the code, the means for identifying a first frequency offset can obtain the first frequency offset by summing a correlation value for each correlation over a number of signal samples. In the code, the correlation value can be a value related to an energy when received samples are combined with the reference signals, the reference signals being derived from a known sequence in the received analog signal. The combining can be multiplication, for example.

The software may also include code for a digitization step on a received analog signal such as to obtain the in-phase component and the orthogonal phase component of the digital baseband signal. Alternatively, the code for the digitization can include an analog/digital conversion followed by a digital downconversion such as to obtain said in-phase component and said orthogonal phase component. The code may also include filtering steps and/or calculation of a vector product on the in-phase and in-quadrature signals.

The present invention includes software products for implementing any of the methods or devices according to the present invention in software for execution on a processing engine such as a microprocessor or an FPGA. The software may be supplied stored on a suitable machine readable signal medium such as an optical disk, e.g. CD-ROM or DVD-ROM, or disk or diskette, solid state memory, etc., which hen inserted in a computing device executes the methods or devices of the invention.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A receive path in a receiver comprising:
   means for deriving at least a first stream of first digitized samples from a received analog signal at a first sampling rate,
   means for identifying a first frequency offset based on a plurality of parallel correlations, each correlation correlating the first stream of the first digitized samples with a different complex reference signal of a plurality of complex reference signals, wherein the plurality of complex reference signals differ from each other by phase offsets;
   a demodulator configured to demodulate symbols from the stream of first digitized samples wherein the demodulator references each demodulated symbol to a respective value for a central symbol in rotated decision areas that are set in accordance with at least the first frequency offset;
   means for identifying a second frequency offset based on tracking a demodulation accuracy for each symbol which is demodulated from the first stream of the first digitized samples; and means for adjusting a setting of the rotated decision areas in accordance with the second frequency offset.

2. The receive path according to claim 1, wherein the demodulation accuracy is an error value referenced to an optimum demodulated symbol point.

3. The receive path according to claim 1, wherein the demodulation accuracy is a phase error.

4. The receive path according to claim 1, wherein the demodulation accuracy is a value related to an error energy for each demodulated symbol.

5. The receive path according to claim 1, wherein the complex reference signals differ from each other by phase offsets which are less than the phase difference between boundaries of one decision area for the demodulated symbols.

6. The receive path according to claim 1, wherein the means for identifying a first frequency offset obtains the first frequency offset by summing a correlation value for each of the parallel correlations over a number of signal samples.

7. The receive path according to claim 6, wherein the correlation value is a value related to an energy maximum when received samples are combined with the complex reference signals, the complex reference signals being derived from a known sequence in the received analog signal.

8. The receive path according to claim 1, further comprising at least one interpolating filter in parallel with the first stream of first digitized samples for generating at least a second stream of digitized samples at the first sampling rate but offset with respect to the first stream by a fraction of a sample time period.

9. The receive path according to claim 1, wherein the demodulator is an M state phase demodulator, where M is greater than 2.

10. The receive path according to claim 1, wherein the receiver is a Bluetooth receiver.

11. A method of operating a receiver comprising:
deriving at least a first stream of first digitized samples from a received analog signal at a first sampling rate,
identifying a first frequency offset based on a plurality of parallel correlations, each correlation correlating the first stream of the first digitized samples with a different complex reference signal of a plurality of complex reference signals, wherein the plurality of complex reference signals differ from each other by phase offsets;
demodulating symbols from the first stream in accordance with the first frequency offset;
referencing each demodulated symbol to a respective value for a central symbol in rotated decision areas that are set in accordance with at least the first frequency offset;
identifying a second frequency offset based on the referencing of each demodulated symbol to determine a demodulation accuracy for each symbol that is demodulated from the first stream of the first digitized samples; and
adjusting a setting of the rotated decision areas in accordance with the second frequency offset.

12. The method according to claim 11, wherein the demodulation accuracy is an error value referenced to an optimum demodulated symbol point.

13. The method according to claim 11, wherein the demodulation accuracy is a phase error.

14. The method according to claim 11, wherein the demodulation accuracy is a value related to an error energy for each demodulated symbol.

15. The method according to claim 11, wherein the complex reference signals differ from each other by phase offsets which are less than the phase difference between the boundaries of one decision area for the demodulated symbols.

16. The method according to claim 11, wherein identifying a first frequency offset includes obtaining the first frequency offset by summing a correlation value for each of the parallel correlations over a number of signal samples.

17. The method according to claim 16, wherein the correlation value is a value related to an energy maximum when received samples are combined with the complex reference signals, the complex reference signals being derived from a known sequence in the received analog signal.

18. The method according to claim 11, wherein the demodulation is an M state phase demodulation, where M is greater than 2.

19. A receive path in a receiver comprising:
a correlator adapted to:
receive as input a stream of digitized samples obtained from a received analog signal;
retrieve from a memory a complex reference signal derived from a known sequence; and
perform a plurality of parallel correlation processes, each correlation process correlating the stream of digitized samples with a different complex reference signal, each complex reference signal differing from each other by phase offsets;
an integrator adapted to integrate an output of each of the plurality of parallel correlation processes and to identify a phase offset for use in demodulating the stream of digitized samples;
a demodulator adapted to demodulate the stream of digitized samples based on the phase offset identified by the integrator to obtain a plurality of demodulated symbols; and
a risk calculator adapted to:
calculate risk values corresponding to each demodulated symbol of the plurality of demodulated symbols.

20. The receive path according to claim 1 further comprising a risk calculator adapted to calculate risk values for each demodulated symbol.

21. The receive path according to claim 1, wherein a complex reference signal is derived from a known sequence in memory.

22. The method according to claim 11 further comprising calculating risk values for each demodulated symbol.

* * * * *